Feb. 13, 1968 P. O. DUANE 3,368,809
BICYCLE EXERCISING STAND
Filed Jan. 8, 1965 2 Sheets-Sheet 1
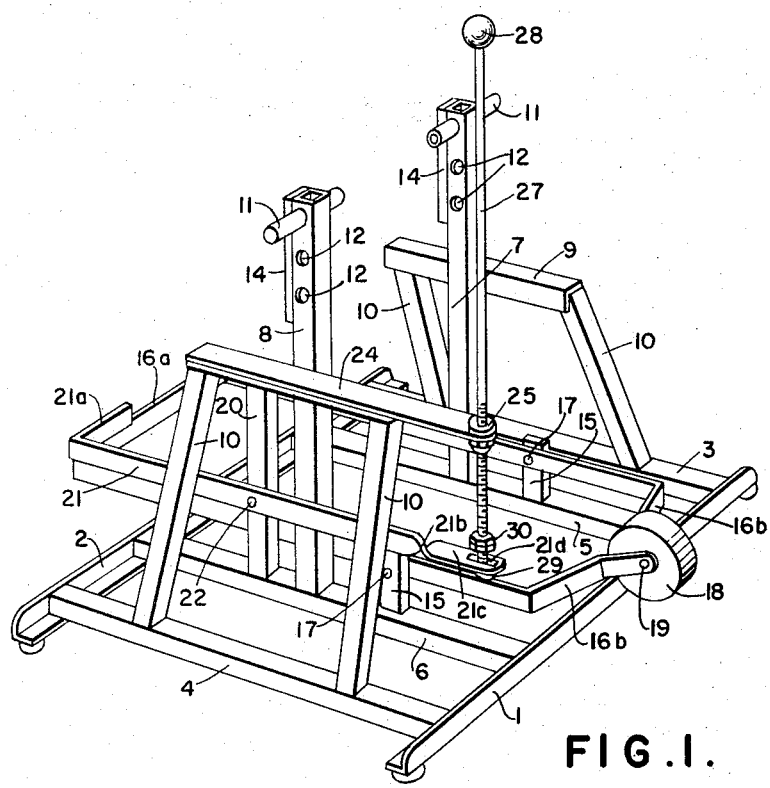
FIG. 1.
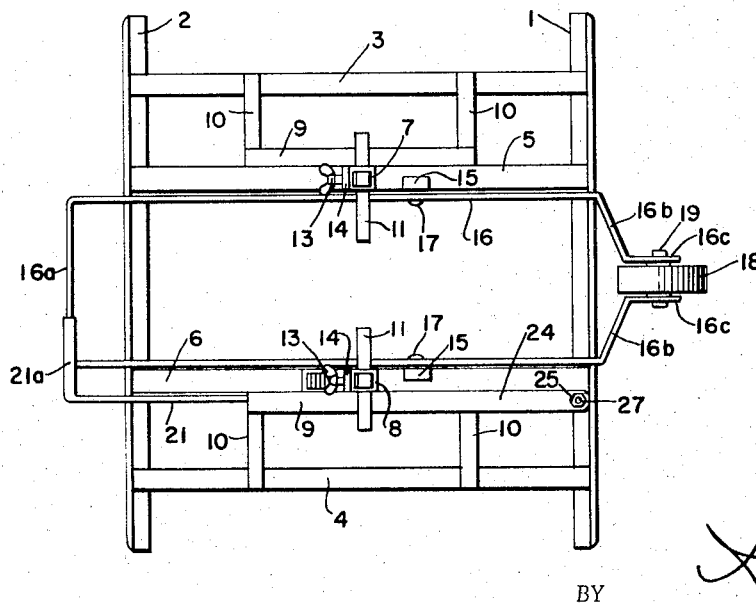
FIG. 2.
INVENTOR
Paul O. Duane
BY 
ATTORNEYS Feb. 13, 1968    P. O. DUANE    3,368,809
BICYCLE EXERCISING STAND
Filed Jan. 8, 1965    2 Sheets-Sheet 2
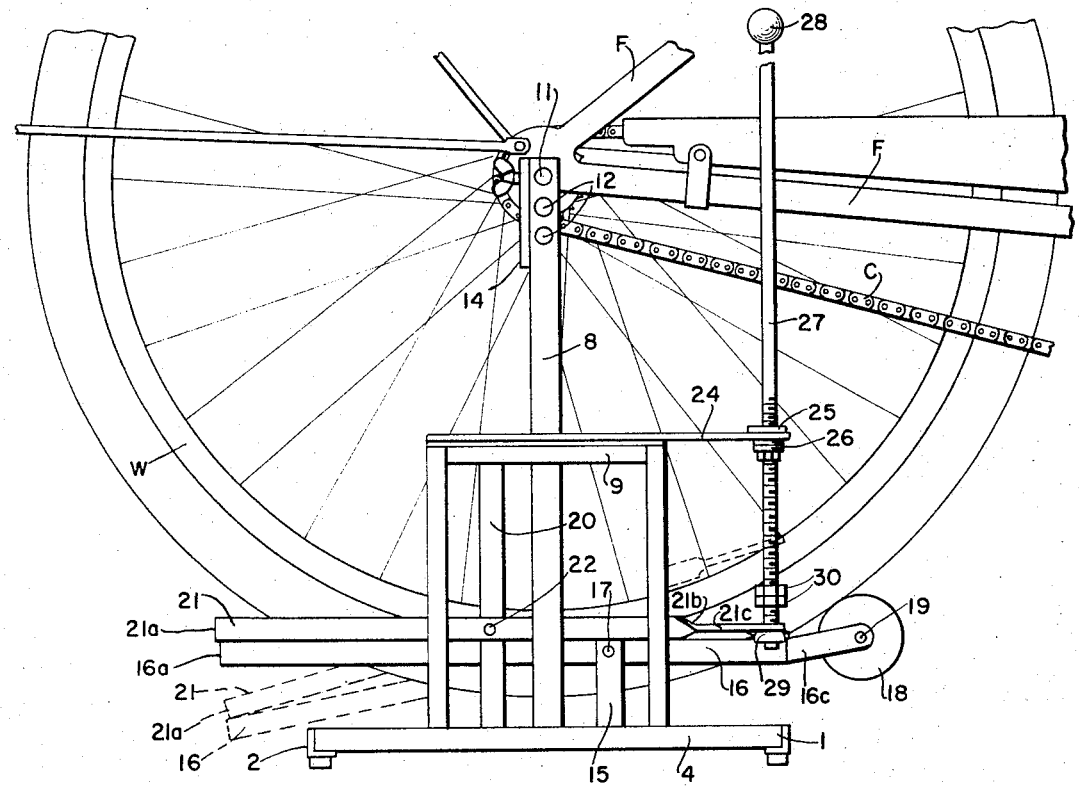
FIG. 3.
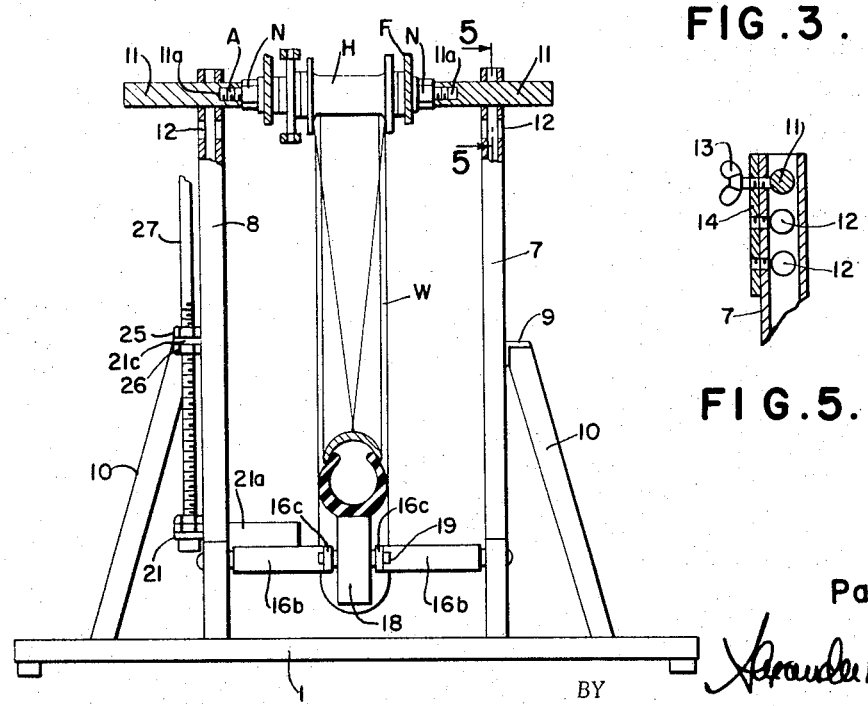
FIG. 4.
FIG. 5.
INVENTOR
Paul O. Duane

United States Patent Office 3,368,809
Patented Feb. 13, 1968

3,368,809
BICYCLE EXERCISING STAND
Paul O. Duane, R.D. 2, Box 119, Mohawk, N.Y. 13407
Filed Jan. 8, 1965, Ser. No. 424,403
8 Claims. (Cl. 272—73)

ABSTRACT OF THE DISCLOSURE

A bicycle exercising device adapted to be placed on a supporting surface whereby the axle of the rear wheel of a bicycle can be supported for free rotation between a pair of uprights, the device having a drag roll disposed at the end of a pivoted frame for engagement with said rear wheel and a manually controlled pivoted lever for varying the pressure of the drag roll against the wheel.

---

The principal object of the invention is to provide a drag roll, swingably mounted on the frame of a device of the above type, adapted to engage the pneumatic tire of the rear wheel of the bicycle to effect a braking action thereon, with means for varying the braking effect of the roll, i.e., the pressure of the roll on the pneumatic tire, said means being readily accessible to the rider of the bicycle seated on the saddle, whereby the leg power required to rotate the rear wheel by the bicycle pedals may be varied at the will of the rider.

Another object of the invention is to provide novel means for supporting the ends of the axle of the rear wheel in the device, said means consisting of rods at each side of the wheel adjustably secured in spaced uprights extending from the frame, said rods having bores in their inner ends receiving the ends of the axle of the bicycle, and said rods being adjustable as to height on said upright so as to suit bicycles having different diameters of wheels, to wit, 20" wheels, 24" wheels, or 26" wheels.

Other minor objects of the invention will be hereinafter set forth.

I will explain the invention with reference to the accompanying drawings, which illustrate one practical embodiment thereof, to enable others familiar with the art to adopt and use the same, and will summarize in the claims the novel features of construction, and novel combinations of parts, for which protection is desired.

In said drawings:

FIG. 1 is a perspective view of my novel bicycle exercising device.

FIG. 2 is a top plan view thereof.

FIG. 3 is a side elevational view showing the rear wheel of a bicycle supported by the device, and showing the drag roll engaging the pneumatic tire of the bicycle wheel.

FIG. 4 is a front end view of the device, partly broken away.

FIG. 5 is an enlarged section on the line 5—5, FIG. 4.

In said drawings, my novel bicycle exercising device consists of a frame adapted to rest upon a floor or the like, the frame having a front member 1, and a rear member 2, which members are connected by outer side members 3 and 4 preferably having their ends brazed to the members 1 and 2 to form a substantially rectangular frame of desired width.

Between the side members 3 and 4 are intermediate members 5 and 6 which are parallel and spaced apart a distance greater than the length of the axle A, FIG. 4, which supports the hub H of the rear wheel W of the bicycle as shown in FIG. 4, the ends of the axle A usually extending beyond the nuts N, FIG. 4, which secure the axle A in the bicycle frame F in the usual manner.

Extending upwardly from the intermediate members 5 and 6 at about the center of the frame are uprights 7 and 8 which are preferably metal tubes of square cross-section as shown in the drawings, the lower ends of the uprights being preferably brazed to their respective frame members 5 and 6, and said uprights being of greater height than the radius of the largest bicycle wheel W which is to be supported thereby.

Preferably the uprights 7 and 8 are braced against separation at their upper ends by inclined braces which, as shown, consist of horizontal bars 9 on the uprights 7 and 8 disposed at about their mid-heights; and outwardly and downwardly extending braces 10 at each end of bars 9 have their lower ends brazed to the outer frame members 3 and 4, respectively, and their upper ends brazed to the underside of the bars 9, to thereby brace the upper ends of the uprights, the brazing of the parts thereby forming a rigid structure.

As shown, the means for supporting the bicycle wheel W in the uprights 7–8 consists of horizontal spaced opposed rods 11 extending through aligned holes 12 in the upper ends of the uprights 7 and 8, which bores 12 are vertically spaced to accommodate bicycle wheels W of different diameters, i.e., 20", 24" or 26".

Each rod 11 is provided at its inner end with a bore 11a, FIG. 4, adapted to receive the adjacent end of the axle A of the rear wheel W of the bicycle, with its inner end engaging the nut N, as shown in FIG. 4, each rod 11 being maintained in axially adjusted position by means of thumb screws 13, FIG. 5, passing through tapped bores in the uprights 7 and 8 opposite the holes 12, face plates 14 being preferably brazed on the upper ends of the uprights 7 and 8 to increase the thickness of the metal in way of the threaded bores which receive the thumb screws 13, as shown in FIG. 5.

The rods 11 may be inserted in any pair of aligned holes 12 according to the diameter of the bicycle wheel W, and when same receive the ends of the axle A of the wheel W, as shown in FIG. 4, and the thumb screws 13 are tightened, the rear wheel W of the bicycle will be rigidly maintained with its axle A parallel with the base 1–4, while the rear wheel W may be rotated through the usual chain C, FIG. 1, by the rider operating the bicycle pedals (not shown) in the usual manner.

Means are provided for pressing a drag roll 18 under varying degrees of pressure against the periphey of the pneumatic tie of the wheel W to exert in varying degrees a braking action on the wheel, thus controlling the energy expended by the rider in rotating the wheel, said pressure of the drag roll 18 being controlled by means positioned adjacent the rider seated on the bicycle saddle (not shown).

As shown, a short pair of uprights 15 are provided on the top of the intermediate frame members 5 and 6 in advance of the uprights 7 and 8, i.e., between the uprights and the front frame member 1; and pivotally mounted on the uprights 15 as at 17 is a metallic frame 16 of substantially rectangular shape, said frame 16 being mounted upon the uprights 15 by pivot bolts 17, FIGS. 1, 2 and 3, so that the frame 16 may pivot as indicated in broken lines in FIG. 3.

Frame 16 is closed on both sides and at its rear 16a, but its front end is broken on the axis of the frame 16, and the sides 16b of the front end of the frame 16 have forward extending flanges 16c which are spaced apart, with a drag roll 18 journaled therein on a bolt 19 or the like, which drag roll 18 is adapted to normally engage the pneumatic tire of the wheel W, as shown in FIG. 3, so as to exert a braking pressure on the wheel to retard rotation thereof.

In order to vary the horizontal angularity of the frame 16 a second upright 20 is provided on the intermediate frame member 6 having its lower end brazed to the member 6 and its upper end brazed to the angle bar 9, as shown in FIGS. 1 and 3, said upright 20 being disposed in rear of the adjacent upright 8, i.e., between the upright 8 and the rear frame member 2, as shown. Pivoted on the upright 20 on a pivot 22, is an operating lever 21 disposed slightly above the frame 16 whereby the lever 21 will normally be maintained at about the same angularity with respect to the horizontal as the frame 16. The rear end of the lever 21 has a flange 21a which overlies the rear end 16a of the frame 16, as shown in the drawings, whereby when the front end of the lever 21 is raised the rear end of the frame 16 will be correspondingly lowered to raise in varying degrees of pressure the drag roll 18 in its contact with the wheel W. The forward end of the lever 21 has a 90° twist 21b so that the end continues relatively horizontally as at 21c, said horizontal portion 21c having a slot 21d therein, FIG. 1, for the purpose hereinafter described.

On the same side of the frame as the lever 21 is an arm 24, FIGS. 1 and 3, which is secured to the top of the adjacent angle iron 9, as shown, and extends forwardly over the slotted end 21d of the lever 21. In the outer end of the arm 24 is a non-rotatable tubular member 25 having a threaded bore, said tubular member being securely clamped to the outer end of the arm 24 by a lock nut 26. Extending vertically through the threaded tubular member 25 is a rotatable operating lever 27 having its lower portion threaded, as shown in FIGS. 1 and 3, said threads engaging those of the bore in the member 25.

On the upper end of the rod 27 is a knob 28 whereby the rod 27 may be readily rotated by the rider of the bicycle, the knob 28 being within easy reach of the rider seated on the saddle of the bicycle. The lower end of the threaded rod 27 passes through the slot 21d of the lever 21 and carries thereon a head 29 as shown in FIGS. 1 and 3, a pair of lock nuts 30 being provided on the threaded portion of the rod 27 positioned slightly above the arm 21. In this manner, when the rider is seated upon the saddle and is rotating the wheel W by the bicycle pedals, he may readily engage the knob 28 of rod 27 and rotate the rod in the fixed member 25, thereby raising or lowering the lever 21 and simultaneously raising or lowering the frame 16, thereby permitting any desired braking pressure to be applied to the wheel W by the drag roll 18, while the device is being operated by the rider.

Owing to the fact that the pivots 17 and 22 of the frame 16 and lever 21 are offset from each other, i.e., disposed on opposite sides of the upright 8, the force exerted by the drag roll 18 due to rotation of the rod 27 will be compounded and very much increased over an arrangement wherein the pivots 17 and 22 were in vertical alignment.

I do not limit my invention to the exact form shown in the drawings, for obviously changes may be made therein within the scope of the claims.

I claim:

1. A bicycle exercising device comprising a base frame; a pair of spaced uprights thereon receiving therebetween the rear wheel of a bicycle; said wheel having an axle, and said bicycle having driving pedals and a saddle; means on the uprights engaging said axle for maintaining the wheel free for rotation by the driving pedals; a brake frame horizontally pivoted on the base frame; a drag roll journaled at one end of the brake frame engaging the rim of the wheel; and means on the base frame operable by the rider seated in the saddle for selectively pivoting the brake frame for varying the pressure of the drag roll on the wheel; said means for varying the pressure of the drag roll, comprising a lever pivoted on the base frame above and substantially parallel with the brake frame and having a flange at one end overlying the end of the brake frame opposite from the drag roll; the other end of the lever having a slot therethrough; a member having a threaded bore fixedly mounted on the base frame above the slot; a vertical threaded rod extending through the threaded bore and through the slot, said rod having a head thereon below the slot; and a knob on the upper end of the rod within easy access of a rider seated in said saddle, whereby when the knob is rotated the brake frame will be correspondingly pivoted to vary the pressure of the drag roll on the wheel.

2. In a device as set forth in claim 1, said maintaining means comprising aligned holes in the upper ends of the pair of uprights; rods in the said holes having bores in their inner ends respectively receiving the ends of the axle; and screws threaded into the uprights normal to the rods and registering with said holes for frictionally binding the rods in adjusted positions.

3. In a device as set forth in claim 2, said holes being arranged in vertically spaced series to suit wheels of various diameters.

4. In a device as set forth in claim 1, the pivots of the brake frame and of the lever being disposed at opposite sides of the uprights.

5. A bicycle exercising device comprising a base frame; a pair of spaced uprights thereon receiving therebetween the rear wheel of a bicycle, said wheel having an axle, and said bicycle having driving pedals and a saddle; means on the uprights engaging said axle for maintaining the wheel free for rotation by the driving pedals; a brake frame horizontally pivoted on the base frame and comprising a U-shaped member journaled on the base frame and disposed between said uprights and having one end axially split, parallel spaced flanges extending from the ends of said split; a drag roll disposed between and journaled in said flanges and engaging the rim of the wheel; and means on the base frame operable by the rider seated in the saddle for selectively pivoting the brake frame for varying the pressure of the drag roll on the wheel; said means for increasing and decreasing the pressure of the drag roll, comprising a lever pivoted on the base frame above and substantially parallel with the brake frame and having a flange at one end overlying the end of the brake frame opposite from the drag roll; the other end of the lever having a slot therethrough; a member having a threaded bore fixedly mounted on the base frame above the slot; a vertical threaded rod extending through the threaded bore and through the slot, said rod having a head thereon below the slot; and a knob on the upper end of the rod within easy access of a rider seated in said saddle, whereby when the knob is rotated the brake frame will be correspondingly pivoted to vary the pressure of the drag roll on the wheel.

6. In a device as set forth in claim 5, said maintaining means comprising aligned holes in the upper ends of the pair of uprights; rods in the said holes having bores in their inner ends respectively receiving the ends of the axle; and screws threaded into the uprights normal to the rods and registering with said holes for frictionally binding the rods in adjusted positions.

7. In a device as set forth in claim 6, said holes being arranged in vertically spaced series to suit wheels of various diameters.

8. In a device as set forth in claim 5, the pivots of the brake frame and of the lever being disposed at opposite sides of the uprights.

References Cited

UNITED STATES PATENTS

| 356,366 | 1/1887 | Loveland | 272—70.1 |
| 860,517 | 7/1907 | Berglund | 272—63 |
| 2,261,846 | 11/1941 | Dollinger | 272—73 |

FOREIGN PATENTS

| 1,309,038 | 10/1962 | France. |
| 52,402 | 6/1890 | Germany. |
| 521,467 | 5/1940 | Great Britain. |

ANTON O. OECHSLE, *Primary Examiner.*

A. W. KRAMER, *Assistant Examiner.*